US012096547B1

(12) United States Patent
Belashchenko

(10) Patent No.: US 12,096,547 B1
(45) Date of Patent: Sep. 17, 2024

(54) HIGH VELOCITY PLASMA TORCH AND METHOD

(71) Applicant: Vladimir E. Belashchenko, Waltham, MA (US)

(72) Inventor: Vladimir E. Belashchenko, Waltham, MA (US)

( * ) Notice: Subject to any disclaimer, the term of this patent is extended or adjusted under 35 U.S.C. 154(b) by 0 days.

(21) Appl. No.: 18/604,706

(22) Filed: Mar. 14, 2024

Related U.S. Application Data

(63) Continuation-in-part of application No. 18/447,759, filed on Aug. 10, 2023, now abandoned.

(51) Int. Cl.
*H05H 1/34* (2006.01)

(52) U.S. Cl.
CPC ........ *H05H 1/3452* (2021.05); *H05H 1/3468* (2021.05); *H05H 1/3478* (2021.05)

(58) Field of Classification Search
None
See application file for complete search history.

(56) References Cited

U.S. PATENT DOCUMENTS 3,823,302 A 7/1974 Muehlberger
4,570,048 A * 2/1986 Poole .................. H05H 1/3405 219/121.5
4,656,330 A * 4/1987 Poole .................. H05H 1/3405 219/121.52
4,780,591 A * 10/1988 Bernecki .................. H05H 1/36 219/121.48
5,147,998 A * 9/1992 Tsantrizos ................ H05H 1/28 219/121.48
5,444,209 A 8/1995 Crawmer et al.
5,637,242 A 6/1997 Muehlberger
5,660,743 A * 8/1997 Nemchinsky ............ H05H 1/34 219/121.48
5,736,708 A * 4/1998 Delzenne ................ H05H 1/34 219/121.52
6,096,992 A * 8/2000 Severance, Jr. .......... H05H 1/34 219/121.49
6,114,649 A * 9/2000 Delcea ..................... H05H 1/42 219/121.52
6,897,402 B2 5/2005 Crawmer
9,150,949 B2 * 10/2015 Belashchenko .......... H05H 1/42
9,376,740 B2 * 6/2016 Belashchenko ......... C23C 4/134
2006/0108332 A1 * 5/2006 Belashchenko .......... H05H 1/34 219/121.47
2012/0323060 A1 * 12/2012 Carabin .................. A62D 3/38 422/162

(Continued)

OTHER PUBLICATIONS

Maher et al., "Thermal Plasmas Fundamentals and Applications", vol. 1, , 1994, pp. 12-13.

(Continued)

*Primary Examiner* — Thor S Campbell
(74) *Attorney, Agent, or Firm* — Grossman, Tucker, Perreault & Pfleger, PLLC

(57) ABSTRACT

A high velocity plasma spray method and apparatus with relatively high plasma pressures of 3 bars or above. The preferable range of plasma pressure is 3 bars to 10 bars and a plasma enthalpy of preferably 10 KJ/g or above. The preferable enthalpy range is above 10 KJ/g and up to 20 KJ/g and the preferred specific power (Σ) is in the range of 16 KJ/g to 33 KJ/g.

13 Claims, 4 Drawing Sheets

(56) References Cited

U.S. PATENT DOCUMENTS

| | | | | |
|---|---|---|---|---|
| 2013/0236652 A1* | 9/2013 | Belashchenko | H05H 1/34 | 427/446 |
| 2016/0024635 A1* | 1/2016 | Belashchenko | B23K 10/027 | 219/121.48 |
| 2023/0192154 A1* | 6/2023 | Swan | B08B 7/00 | 134/1.1 |

OTHER PUBLICATIONS

Maher et al., "Thermal Plasmas Fundamentals and Applications", vol. 1, , 1994, pp. 402-405, 422-425 and 438-441.
Praxair Surface Technologies, "Model SG-100 Plasma Spray Gun Operator's Manual", Revision H, 2011.
Sutton, "Rocket Propulsion Elements An Introduction to the Engineering of Rockets", Sixth Edition, 1992, pp. 96-99.
Voronetski et al., "Analysis of Potential Improvements of HVOF Based Processes", Thermal Spray International Thermal Spray Conference Proceedings, 2006, Seattle, Washington, pp. 637-642.

* cited by examiner

HIGH VELOCITY PLASMA TORCH AND METHOD

FIELD

The present disclosure is directed at a high velocity plasma spray method and apparatus.

BACKGROUND

High velocity processes may generally use pressurized gases or plasma to produce high velocity subsonic, sonic and supersonic gas or plasma jets. High quality coatings can be sprayed at a high level of efficiency when the temperature of the gas jet is high enough to soften or melt the particles being sprayed and the velocity of the stream of compressed gases is high enough to provide the required density and other coating properties. Different materials require different optimum temperatures and velocities of the sprayed particles in order to provide an efficient formation of high-quality coatings. Higher melting point and lower thermal conductivity materials, such as, for example, oxides, may require relatively high gas temperatures and high heat transfer capability from a plasma jet in order to melt or soften the particles to a level sufficient to efficiently form high quality coatings.

Heat transfer from the gas or plasma to feedstock may be characterized by Heat Transfer Potential (HTP) which is the major parameter determining plasma ability to heat particles and substrate:

$$HTP(T) = \int_{T_0}^{T} \lambda(T)dT$$

where λ is plasma thermal conductivity; T is plasma temperature. HTP may have a correlation with plasma enthalpy H and specific power (λ). H, λ and thermal efficiency n may be determined as follows:

Σ=W/G; H=W*η/G; n=1−Lw/W; W=U*I where Lw is power losses into cooling media (water); U is plasma torch voltage; I is plasma current; W is electrical power of a torch; and G is the total plasma gas flow rate, which can be measured, e.g., in grams/second, or kilograms/second, etc. Enthalpy H and specific power Σ may be easily calculated using parameters above directly measured during the experiments. Thus, H and/or Σ are often used to characterize plasma conditions and further calculations of plasma HTP and temperature.

The major high velocity industrial processes may be separated in 4 groups as following: Cold or Kinetic Spray, Warm Spray and HVAF (high velocity air-fuel), HVOF (high velocity oxy-fuel), and plasma based high velocity. HVOF may provide with the highest HTP among first three processes and the major HVOF parameters may be seen in Table 1 which is based on the data published in a paper Analysis of Potential Improvement of HVOF Based Processes, A. Voronetski and V. Belashchenko, ITSC 2006.

TABLE 1

Properties of gaseous hydrocarbon fuels at α = 1.

| Flame Parameter | Propane $C_3H_8$ | Methane $CH_4$ | Kerosene $C_9H_{20}$ | Ethanol-96% $C_2H_5OH$ |
|---|---|---|---|---|
| $T_{C@0.1}$, K | 3094 | 3052 | 3109 | 2944 |
| $T_{CC@0.5}$, K | 3310 | 3261 | 3335 | 3128 |
| λ, W/(m × K) | 0.3 | 0.32 | 0.28 | 0.29 |
| HTP, W/m | 993 | 1043 | 934 | 907 |

In Table 1, $T_{C@0.1}$ is the combustion temperature at atmospheric pressure (0.1 MPa); $T_{CC@0.5}$ is combustion temperature at 0.5 MPa combustion pressure (≈70 psi); λ is thermal conductivity of combustion products; $E_K=(\rho W^2)_{ne}$ measured in kg/(m×sec²) is the specific kinetic energy of combustion products exiting the nozzle; $HTP=(\lambda T_{CC@0.5})_{ne}$ is the heat potential characterizing the efficiency of heat transfer from combustion products to spraying particles. The available range of heat potential and specific kinetic energy may allow HVOF processes spraying high quality coatings using, e.g., some carbide and metallic feedstock. However, available HTP of HVOF processes may not be sufficient for spraying, e.g., some high-quality coatings using high melting point ceramics and metals.

Plasma temperature and related HTP may be significantly above HTPs of gaseous or liquid hydrocarbon fuels that are in Table 1, thus may providing wider operating window and creating more opportunities to spray high quality coatings using high temperature materials. Some reference plasma data for nitrogen plasma and argon—20% hydrogen plasma at atmospheric pressure are presented in Table 2 and Table 3. Table 2 illustrates capability of nitrogen plasmas. Table 3 illustrates capability of Ar-20% H2 plasmas. Note, that Argon plasma without additive of H2 or He may only generate plasmas with lower enthalpies than depicted in Table 3.

The data are based on Plasma Tables published in Thermal Plasmas, Fundamentals and Application, Volume 1. Maher I Boulos, Pierre Fauchais, and Emil Pfender. Plenum Press.

TABLE 2

Some properties of nitrogen plasmas at atmospheric pressure

| T(K) | Therm. Cond W/(m × K) | HTP W/m | Enthalpy KJ/g |
|---|---|---|---|
| 5600 | 1.64 | 9184 | 8.84 |
| 6000 | 2.68 | 16080 | 11.5 |
| 6400 | 3.96 | 25344 | 15.5 |
| 6800 | 5.05 | 34340 | 21.1 |
| 7200 | 5.27 | 37944 | 28.1 |
| 7600 | 4.46 | 33896 | 34.9 |

TABLE 3

Some properties of argon - 20% hydrogen plasmas at atmospheric pressure

| T(K) | Therm. Cond W/(m × K) | HTP W/m | Enthalpy kJ/g |
|---|---|---|---|
| 5000 | 0.57 | 2850 | 6.3 |
| 6000 | 0.57 | 3420 | 7.1 |
| 7000 | 0.66 | 4620 | 7.9 |
| 8000 | 0.83 | 6640 | 8.7 |
| 9000 | 1.12 | 10080 | 9.8 |
| 10,000 | 1.54 | 15400 | 11.5 |

It may be seen that plasmas may be significantly more promising for high velocity thermal spray processes in comparison with combustion products when high temperature materials are to be sprayed. It may be specifically said about nitrogen-based plasma that may provide significantly higher HTP than combustion processes or argon-based plasma spray processes.

There are multiple patents disclosing different design and technology options that may generate high pressure and high velocity plasmas to deposit coatings. However, presently, only SG-100 plasma torch with Mach II anode/nozzle originally disclosed in U.S. Pat. No. 3,823,302 is commercially available and may spray relatively high-quality coatings. SG-100 went also through some upgrades disclosed in U.S. Pat. Nos. 5,444,209 and 6,897,402. In accordance to SG-100 Manual (Praxair Surface Technologies, Model SG-100 Plasma Spray Gun Operator's Manual, Manual Part Number: 05001760) and some additional experimental data SG-100 high velocity option with Mach-II anode may operate with the only plasma gases consisting of Ar—He mixture. Reported maximum plasma torch power is 72 kW for Mach II option, estimated HTP is about 4,000 W/m and the range of operating enthalpies of approximately 10-12 KJ/g. This level of HTP together with 72 kW maximum torch power limit operating window of SG-100 and allows to spray coatings with the maximum spray rate of only 25 g/min in accordance to the Manual. Additionally, Helium is a very expensive gas that results in additional disadvantages of SG-100.

Other attempts to develop more efficient high pressure and high velocity plasma options couldn't satisfy some practical requirements. For example, U.S. Pat. No. 5,637,242 disclosed a high velocity, high pressure plasma gun operating using nitrogen. This approach was very promising as, in accordance to Table 2, nitrogen plasma may satisfy requirements to high efficiency high velocity plasmas. However, the disclosure informed that the plasma gun may generate only plasmas with the following parameters: stagnation enthalpy is within 1740-2904 BTU/lb or 4.04-6.75 KJ/g that corresponds to HTP range of approximately 790-4,300 W/m; Stream temperature was within 1,794.2 K-3,484.9 K and stagnation pressure 9.3-11.8 ATM. It may be seen that available enthalpy and temperature are below enthalpies and temperatures of plasma generated by SG-100. It may be also seen that enthalpy and pressure are comparable with those generated by HVOF.

Based on the above, it may be concluded that Nitrogen-based plasmas are very promising for relatively high velocity applications which are presently may be available only at low enthalpies below 6.75 KJ/g. High temperature ceramics and metals, for example, may need enthalpies of about 14-15 KJ/g and even more to melt or soften certain size particles within very short dwell time associated with supersonic plasmas generated at pressure 3 bars or above. It may be noted that the preferred target of the present disclosure is to disclose a plasma torch and process capable to reliably and efficiently generate N2-based supersonic plasmas having plasma stagnation pressure 3 bars or above and plasma enthalpy 10 KJ/g or above. HTP of these plasmas may be more than 11,000-12,000 W/m which is significantly higher HTPs of all presently available HVOF and high velocity plasma processes.

SUMMARY

A method for depositing a coating from a plasma torch comprising:

supplying a plasma torch including a cathode module having a cathode electrode, an anode module having an anode electrode having an anode axis, entrance zone and a cylindrical zone having diameter D1 wherein said plasma torch generates a plasma arc having an anode arc root attachment inside said anode;

said plasma torch further including a first forming module (FM1) having a converging-diverging nozzle with a throat diameter Der and with an exit diameter D2 and a second forming module (FM2) positioned downstream of said first forming module and downstream of said anode arc root attachment;

said second forming module controls one or more parameters of the plasma jet in said second forming module;

an interelectrode module controlling a plasma arc passage between said cathode electrode and said anode electrode having one end adjacent said cathode module and a second end adjacent said anode module and having a pilot insert adjacent to said cathode;

at least one neutral inter-electrode insert;

said plasma torch further comprising two passageways to feed plasma gas in a total amount G;

said plasma torch generating a voltage (U) above 150 V and current (I) below 500 A with a power W=U×I;

supplying a feedstock into said plasma jet and depositing a coating on a substrate;

wherein said plasma gas comprises more than 50 vol. % of molecular gas;

wherein W/G is in the range of 16 KJ/g to 33 KJ/g;

wherein plasma pressure is at or above 3 bars;

wherein one of said passageways for feeding plasma gas comprises a first plasma gas passage located between said cathode and pilot insert for feeding plasma gas in amount G1 wherein said gas is directed through a plurality of orifices having a surface area S1 wherein a vortex is formed having a vortex intensity Vort1=G1/S1;

wherein one of said passageways for feeding plasma gas comprises a second plasma gas passage located between said interelectrode module and said cylindrical part of anode for feeding plasma gas in an amount G2;

wherein said gas is directed through a plurality of orifices having a surface area S2 wherein a vortex is formed having a vortex intensity Vort2=G2/S2; and wherein G2 flow rate is above 25 L/min; and wherein said Vort2 is greater than 0.4 g/((sec)(mm$^2$)).

A plasma torch comprising:

a cathode module having a cathode electrode, an anode module having an anode electrode having an anode axis, entrance zone and a cylindrical zone having diameter D1 wherein said plasma torch generates a plasma arc having an anode arc root attachment inside said anode;

said plasma torch further including a first forming module (FM1) having a converging-diverging nozzle with a throat diameter Der and with an exit diameter D2 and a second forming module (FM2) positioned downstream of said first forming module and downstream of said anode arc root attachment;

said second forming module controls one or more parameters of the plasma jet in said second forming module;

an interelectrode module controlling a plasma arc passage between said cathode electrode and said anode electrode having one end adjacent said cathode module and a second end adjacent said anode module and having a pilot insert adjacent to said cathode;

at least one neutral inter-electrode insert;

said plasma torch further comprising two passageways to feed plasma gas in a total amount G;

said plasma torch operates a voltage (U) above 150 V and current (I) below 500 A with a power W=U×I;

wherein said plasma gas comprises more than 50 vol. % of molecular gas;

wherein W/G is in the range of 16 kJ/g to 33 KJ/g;

wherein plasma pressure is at or above 3 bars;

wherein one of said passageways for feeding plasma gas comprises a first plasma gas passage located between said cathode and pilot insert for feeding plasma gas in amount G1 wherein said gas is directed through a plurality of orifices having a surface area S1 wherein a vortex is formed having a vortex intensity Vort1=G1/S1;

wherein one of said passageways for feeding plasma gas comprises a second plasma gas passage located between said interelectrode module and said cylindrical part of anode for feeding plasma gas in an amount G2;

wherein said gas is directed through a plurality of orifices having a surface area S2 wherein a vortex is formed having a vortex intensity Vort2-G2/S2; and wherein G2 flow rate is above 25 L/min; and wherein said Vort2 is greater than 0.4 g/((sec)($mm^2$)).

BRIEF DESCRIPTION OF THE DRAWINGS

Features and advantages of the claimed subject matter will be apparent from the following description of embodiments consistent therewith, which description should be considered in conjunction with the accompanying drawings, wherein:

DETAILED DESCRIPTION

The present disclosure, as noted, relates to systems and methods of relatively high velocity plasma spraying and plasma treatment of materials. The preferred system and method is contemplated to efficiently generate nitrogen-based plasmas having not less than 50% of nitrogen and the preferred characteristics include one or more of the following:

relatively high plasma pressures of 3 bars or above. The preferable range of plasma pressure is 3 bars to 10 bars, more preferably 3 bars to 8 bars.

a plasma enthalpy of preferably 10 KJ/g or above. The preferable enthalpy range is above 10 KJ/g and up to 20 KJ/g.

a specific power (λ) in the range of 16 KJ/g to 33 KJ/g.

Figure 1:
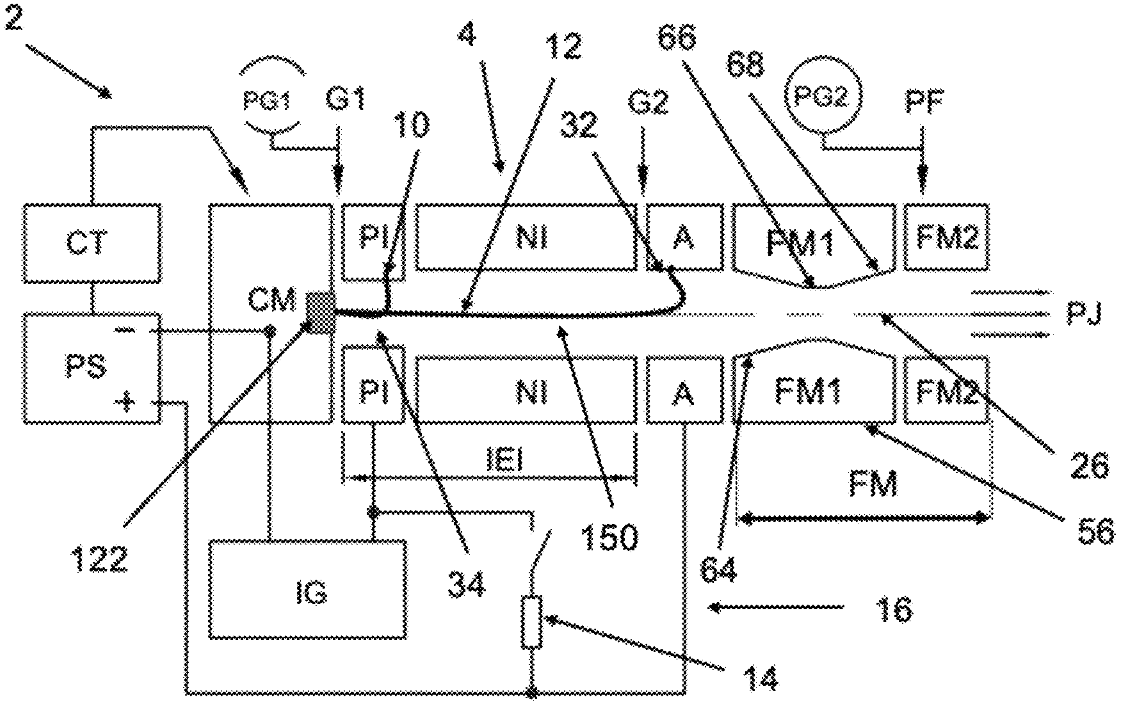
FIG. 1 provides a schematic of a high velocity plasma system having a supersonic forming module FM1.

FIG. 1 illustrates a schematic illustration of plasma system for modification and optimization herein. As shown the plasma system 2 may generally be based on a plasma torch 4. The plasma system 2 may include a variety of modules which may include a DC power source module (PS); control module (CT), which may control plasma gases flow rates, the plasma current and voltage, sequence of events during plasma starts up and shut down, etc.; plasma ignition module (IG) and ignition circuit 16. The ignition module IG may have a high voltage, high frequency oscillator. The oscillator may initiate a pilot electrical arc 10 between the cathode 122 and the pilot insert PI. The DC power source PS may be employed to support the pilot arc 10. The pilot arc 10 may ionize at least a portion of the gases in an upstream plasma passage 34. The low resistance path formed by ionized gas may allow initiation of a main arc 12 in an arc passage 26 between cathode 122 and anode module A. The switch 14 may be disengaged after the main arc 12 has been established, thus interrupting the pilot arc 10.

The plasma torch 4, itself, may include a cathode module CM having at least one cathode 122; an inter-electrode inserts module (IEI) expanding and stabilizing the arc; an anode module (A) and a plasma jet forming module FM (containing FM1 and FM2) located downstream of said anode module A and anode arc root attachment 32 which forming module controls one or more parameters of the plasma jet in said module. Cathode Module may also have a pressure gauge PG1 to measure the back pressure in the upstream plasma passage 34. Inter-electrode inserts module (IEI) may include a Pilot Insert (PI), and at least one neutral inter-electrode insert (NI).

A plasma jet forming module FM may include two forming sub-modules FM1 and FM2. The forming module FM1 may have a High Velocity Nozzle (HVN). Generally, HVN may be converging-diverging or de Laval nozzle widely used to accelerate a compressible gas to supersonic speeds by converting the thermal energy of the flow into kinetic energy. The HVN 56 may consist of the following zones: conversion zone 64 providing a transition from a cylindrical portion of anode to a cylindrical throat 66 having diameter Der, and diverging zone 68 providing acceleration of plasma to supersonic velocity. Namely, the diameter Der is measured within the throat and between the converging zone and the diverging zone.

Detailed information regarding converging-diverging or De Laval nozzles design and characteristics may be found in multiple books and papers. For example, isentropic flow Tables available at http://www.cchem.berkeley.edu/cbe150a/isentropic_flow.pdf.

The plasma forming and feedstock feeding module FM2 may be provided for the final shaping and controlling plasma jet as well as for introducing a material feedstock from the feedstock feeding module PF into the plasma jet 26 of plasma generated by the plasma torch 4. Material feedstock may be in a form of powder. It may also be in a form of liquid precursor or suspension of fine powders in liquids like ethanol or water. FM2 may be equipped with a pressure gauge PG2 to measure pressure in one of feedstock passages 6 depicted on FIG. 2 illustrating a torch 4 that was used for the initial trials and further modification.

Figure 2:
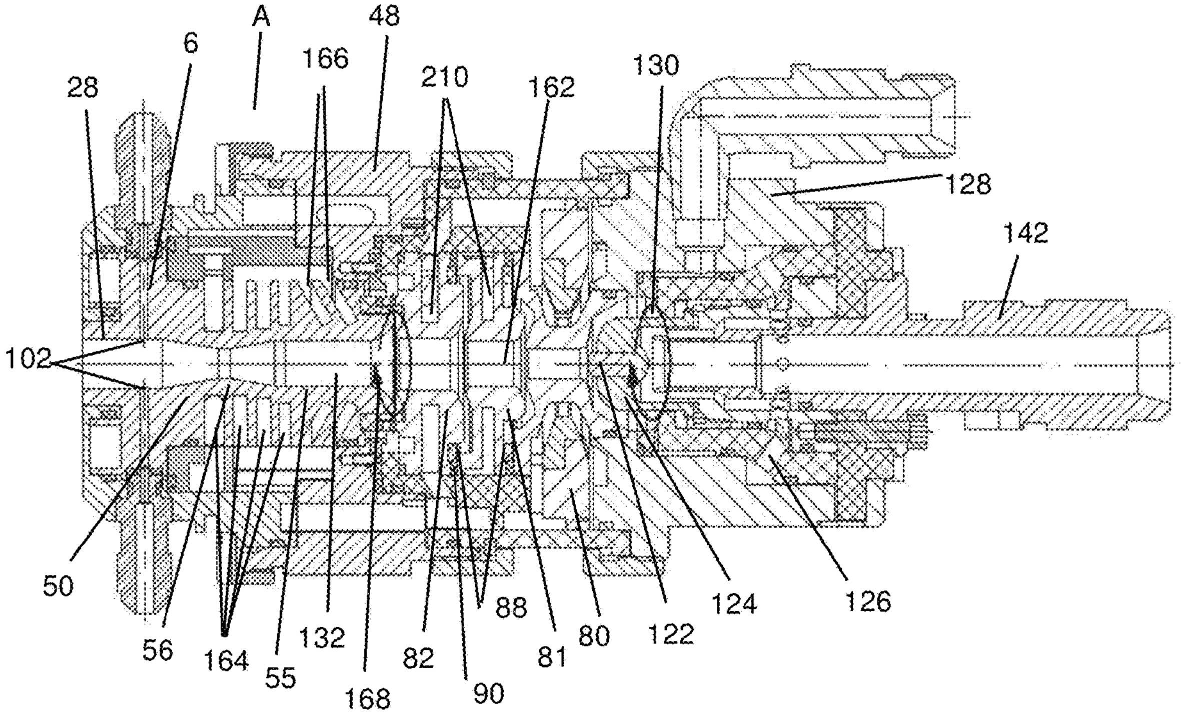
FIG. 2 illustrates an embodiment of a high velocity plasma torch herein.

Cathode Module C may have a cathode holder 124 with cathode insert 122, cathode housing 128 and cathode vortex distributor 126 that may provide a cathode plasma gas G1 with a tangential component of velocity, thus creating vortex 130 shown on FIG. 2 in the area located between the cathode 122 and pilot insert 80. The vortex 130 may propagate downstream along plasma arc area thus it may cause stabilization of the arc. The vortex intensity may be characterized by a ratio Vort1=G1/S1 where S1 is a surface area of the G1 vortex orifices. Power and water-cooling cable may be connected to a fitting 142.

A second plasma gas or anode plasma gas G2 may also be used to generate the plasma. The anode plasma gas G2 may be supplied through a passage located between IEI module and Anode module. G2 may also have a tangential component of the gas velocity providing the same rotation direction as G1, as shown on FIG. 2 and forming the second or anode vortex 168. For nitrogen-based plasmas anode erosion rate mainly depends on the plasma current and efficiency, stability and frequency of anode arc root rotation. The efficiency of the anode arc root rotation may be mainly characterized by both G2 flow rate and anode vortex intensity Vort2=G2/S2 where S2 is a surface area of the G2 vortex orifices. It is also noted herein that the total flow rate G=G1+G2.

An Inter-Electrode Inserts (IEI) module may consist of a pilot insert 80 and one or more neutral inserts. Two neutral inserts 81-82 are shown on FIG. 2 and may be used in the depicted embodiment. The neutral inserts may have cooling passages 210 located radially to the plasma axis 162. The neutral inserts may be electrically insulated from each other and from pilot insert 80 by a set of ceramic rings 88 and sealing O-rings 90.

Anode module A may consist of anode housing 48 and Anode-FM combination 50. The Anode portion 55 of the combination 50 and upstream portion of FM1 56 may have cooling grooves 164 located perpendicular to plasma axis 162. Anode 55 may also have the cooling grooves 166 positioned under some angle to the plasma axis 162 because of the limited accessibility to these areas under the right angle. The FM2 sub-module may have one or more feedstock passages 6 having a diameter df between the internal walls that form the feedstock passage to feed and inject feedstock into the plasma jet inside the barrel 28 located downstream of the exit(s) 102 of feedstock passage(s) 6. The internal wall structure of the feedstock passage is preferably a cylindrical wall structure.

The torch preferably operates at power up to 100-120 KW at the cooling water flow of 35-45 L/min or above providing average cooling water velocity in the cooling grooves 164 and 166 at a level of 3.2-4.1 m/sec. The torch may be scaled up and operate, e.g., at 200 kW power level and even higher, if needed. The torch may therefore preferably operate in the range of 75 kW to 250 kW.

Figure 3:
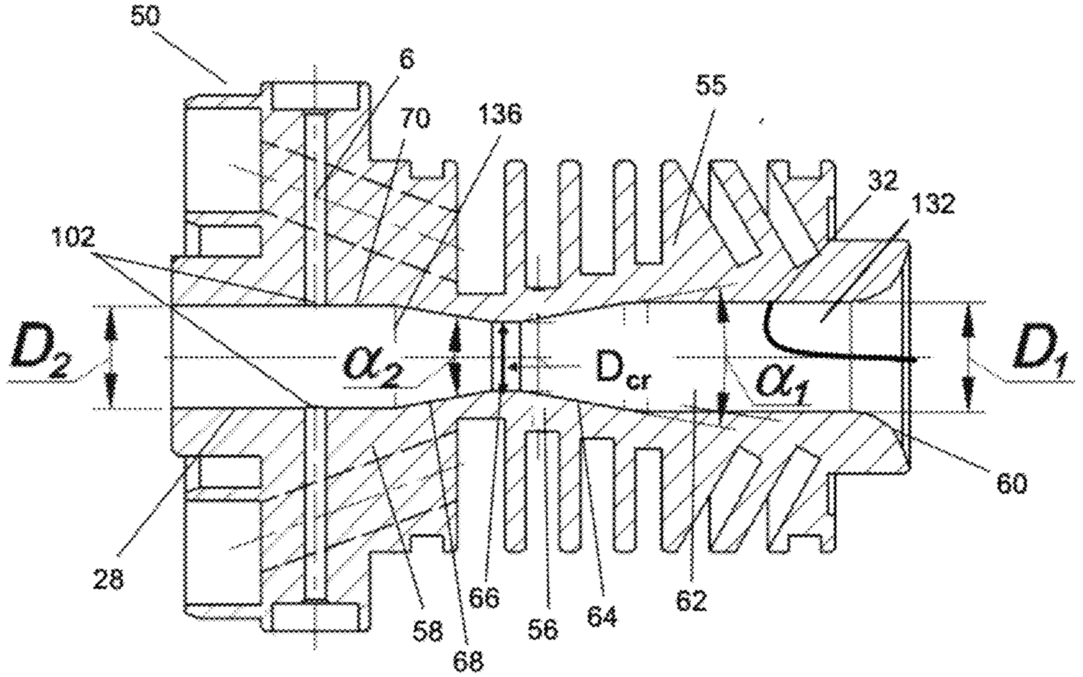
FIG. 3 illustrates a single piece anode-FM combination.

FIG. 3 illustrates the anode-FM combination 50 in more detail. The combination may be made from the copper or copper alloy. Oxygen free copper is mainly used for anodes. The combination 50 may utilize an anode portion 55, supersonic high velocity nozzle 56 and FM2 portion 58 depicted in FIG. 3. The anode portion may preferably include the anode entrance zone 60 and cylindrical zone 62 having diameter D1. The anode arc root attachment 32 may locate inside the anode cylindrical zone 62 of the anode portion 55.

The supersonic nozzle 56 may include the conversion zone 64 providing a transition from a cylindrical portion of anode to a throat or critical zone 66 having diameter Der, diverging zone 68 having the exit 136 and providing acceleration of plasma to supersonic velocity. Preferably, the throat diameter Der is 4 mm or above. The preferable Der range is (0.4 to 0.6)*$W^{0.5}$, where W is the electrical power measured in kW and Der is measured in mm. In this equation, the units of kW is not included, just the underlying value. Thus, for 100 KW torch power the preferable Dcr diameter is 4 mm to 6 mm and for W=200 kW the preferable Der is 5.6 mm-8.4 mm. The nozzle exit diameter is identified as D2. The preferable D2 diameter is 1.05-1.5 times the value of Dcr. Anode cylindrical portion 62 and supersonic nozzle (HVN) 56 used during the experiments had the following dimensions: D1=8 mm; α1-40°. Der was within 4 mm-6 mm.

FM2 upstream cylindrical portion 70 may locate upstream of the feedstock passage 6 and the exit of the diverging zone 68 having diameter D2. This cylindrical portion 70 may be needed to minimize the diverging component of plasma velocity before injecting the feedstock to the plasma. However, the cylindrical portion 70 may slightly decrease thermal efficiency of the torch. Therefore, in the cases when thermal efficiency is more important than the radial component of plasma velocity the cylindrical portion 70 may be minimized or eliminated.

FM2 may also have a cylindrical barrel 28 located downstream of the feedstock passage 6. The barrel may have diameter D2 and length of about 6-40 mm. The barrel may also have other diameters and length that may be dictated by the technological requirements and available feedstock.

Initial experiments were performed using nitrogen-based plasma gases at pressure 3-8 bars. Cathode gas flow G1 was within the range 110-220 slpm. Current was 200-500 A and voltage was up to 310V. Anode plasma gas G2 was nitrogen-argon mixtures having different N2/Ar ratios. G2 flow was within 0.55-2.2 g/sec. Total anode vortex orifices surface area was S2=1.4-1.7 $mm^2$. Thus, anode vortex intensity Vort2=G2/S2 was approximately in the range of 0.3-1.5 g/(sec*$mm^2$) while maximum Vort2 disclosed in U.S. Pat. No. 9,150,949 was 0.4.

Several disadvantages that didn't allow to use this torch option for the practical industrial use were observed. Process and hardware changes and modifications were needed. The following process changes and upgrades may be considered and disclosed:

Anode Erosion

Figure 4:
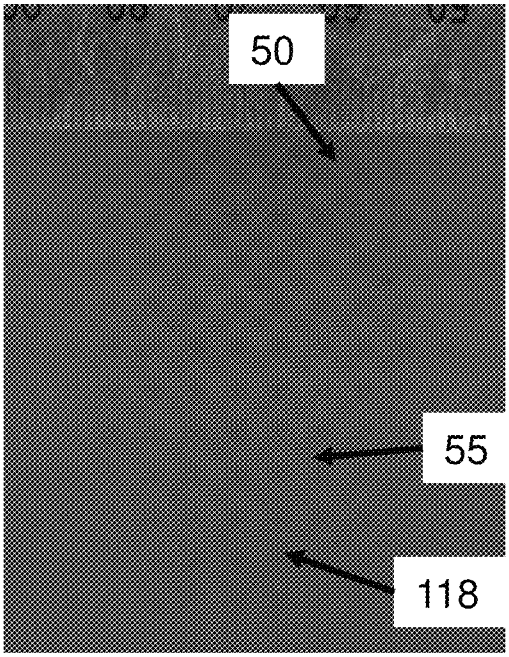
FIG. 4 illustrates a cross-section of an anode-FM combination cut in 2 parts after use.

Excessive erosion of the anode portion 55 was observed during the initial experiments. It was significantly above the erosion observed when the spray trials were performed at atmospheric pressure. High erosion and re-solidification areas was specifically observed inside the anode at the ring shape area 118 associated with anode arc root attachment at G2 flow rate below 25 L/min. FIG. 4 illustrates this area 118 at the crossection of Anode-FM combination cut in 2 parts after less than one hour of the experiments.

So intensive erosion results in very short life of anode as well as in the spitting of the eroded and molten copper that may contaminate coatings which is, as a rule, unacceptable. Anode erosion increased with the plasma gas pressure and decreased with higher flow rate of anode plasma gas and Vort2 intensity. It was found that G2 flow rates above 25 L/min and vortex intensity above 0.4 g/(sec*$mm^2$) are preferred to provide a relatively more efficient rotation of the anode arc root attachment and to achieve the acceptable erosion of the anode. G2 flow rates may therefore be in the range of above 25 L/min to 150 L/min The preferable G2 flow range is 35 L/min to 75 L/min. The preferable Vort2 range is above 0.40 g/(sec*$mm^2$) up to 1.0 g/(sec*$mm^2$). The targeted and preferred specific power λ of 16 KJ/g-33 KJ/g is achievable within these preferable ranges of G2 and Vort2. It may be also noted that, unexpectedly, a relatively insignificant tangential component of plasma jet velocity was identified downstream of the FM1 at these preferred values of G2 and Vort2.

Requirements to the enhanced G2 flow and intensity Vort2 may be explained as follows: For nitrogen plasmas at atmospheric pressure and current 400-500 A the heat flux Qp from plasma to the plasma passage walls including the anode wall of the plasma passage 132 inside anode may be approximately estimated on a level of about (1.5-3.0)*$10^4$ kW/m2 that may depend on the torch power and efficiency. At the same time for the same plasmas the estimated heat flux Qa from anode arc root attachment to anode wall may achieve values (1.5-2.0)*$10^5$ kW/m2 and even above when there is no anode swirl applied to rotate the arc. It may be noted that (1.5-2.0)*$10^5$ kW/m2 was estimated as maximum heat flux that could be handled by even sophisticated water-cooling arrangement (Thermal Plasmas. Fundamentals and Applications, Volume 1. Maher I Boulos, Pierre Fauchais, and Emil Pfender. Plenum Press, page 13). Thus, even at atmospheric pressure anode swirl and related arc rotation are needed to rotate the anode arc root attachment and distribute heat along the ring shape area associated with anode arc root attachment rotating inside anode thus increasing the life of torches running nitrogen-based plasmas. U.S. Pat. No. 9,150,949 disclosed that anode vortex intensity Vort2 within 0.1-0.4 g/(sec*$mm^2$) is sufficient at atmospheric pressure to provide the relatively low anode erosion level.

It is known that steady-state heat transfer equations the heat flux is proportional to δ in degree 0.8, where δ is the gas density which is proportional to the gas pressure (e.g., George P. Sutton, Rocket Propulsion Elements, sixth Edition, p.p. 97-98). Thus, the heat flux Qp may be estimated as $Qp \sim P_p^{0.8}$ where $P_p$ is the plasma pressure. So, it may be noted that Qp may already achieve approximately (5.4–10.8)*$10^4$ kW/m2 at 5 bars plasma pressure, (8.0–15.8)*$10^4$ kW/m2 at 8 bars plasma pressure and (9.5–19.0)*$10^4$ kW/m2 at 10 bars plasma pressure. These values may explain why an anode may get the increased erosion values at plasma pressures above 8 bars even if the anode swirl provides with the efficient arc rotation decreasing significantly Qa input in the total heat flux.

Powder Buildup in the Barrel

Figure 5:
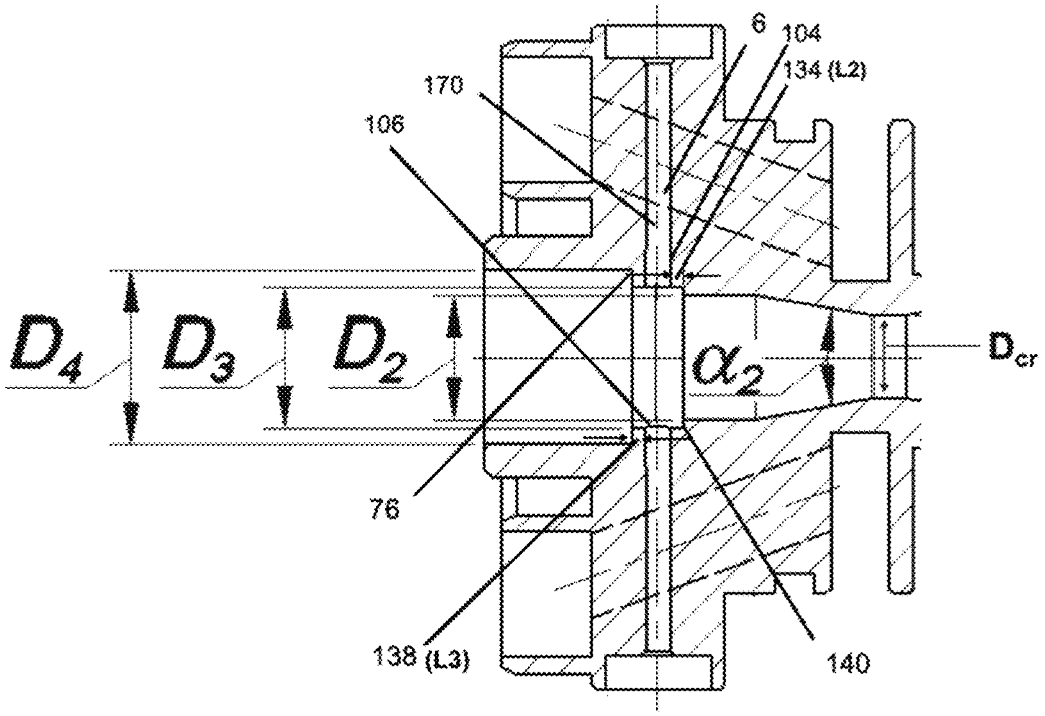
FIG. 5 illustrates a FM2 having a two stepped expansion.

It has been identified that powder buildup within the forming module may be reduced by the use of stepped expansions within the second forming module FM2 downstream of the nozzle. See FIG. 5. A first stepped expansion 140 downstream of D2 preferably has a diameter D3 with a value of 1.05 to 1.3 times the value of D2. A second stepped expansion 76, having a diameter D4, downstream of the first stepped expansion, preferably has a value 1.1 to 1.5 times the value of D3. The ratio of D4/D3 is preferably in the range of 1.15 to 1.3. It may be noted that the first stepped expansion 140 generates a relatively low-pressure zone in the feedstock injection area that also assists with achieving a stable feedstock feeding including small size powders (at or below 10 micron diameter).

It may therefore be understood herein that the velocity of the plasma emerging from FM1 is supersonic. However, it should be understood herein that the velocity of the plasma emerging from FM2 may be supersonic or subsonic.

The shortest distance L2 between the feedstock passage internal wall 104 and step 140 is L2=0.3 mm to 2.5 mm. This shortest distance is illustrated at 134 in FIG. 5. The shortest distance L3 between the feedstock passage wall 106 and step 76 may also have a value L3=0.3 mm to 2.5 mm. This shortest distance L3 is illustrated at 138 in FIG. 5.

Multiple trials at different plasma pressures demonstrated that the step 140 may generate the stable vacuum pressure in the feedstock injection zone. The vacuum pressure was measured within 7-17 inches of Hg (0.23-0.57 bars) within all range of the tested operating parameters. The vacuum pressure was very stable for each tested set of parameters.

Extension of the Barrel and Anode-FM Cooling

Figure 6:
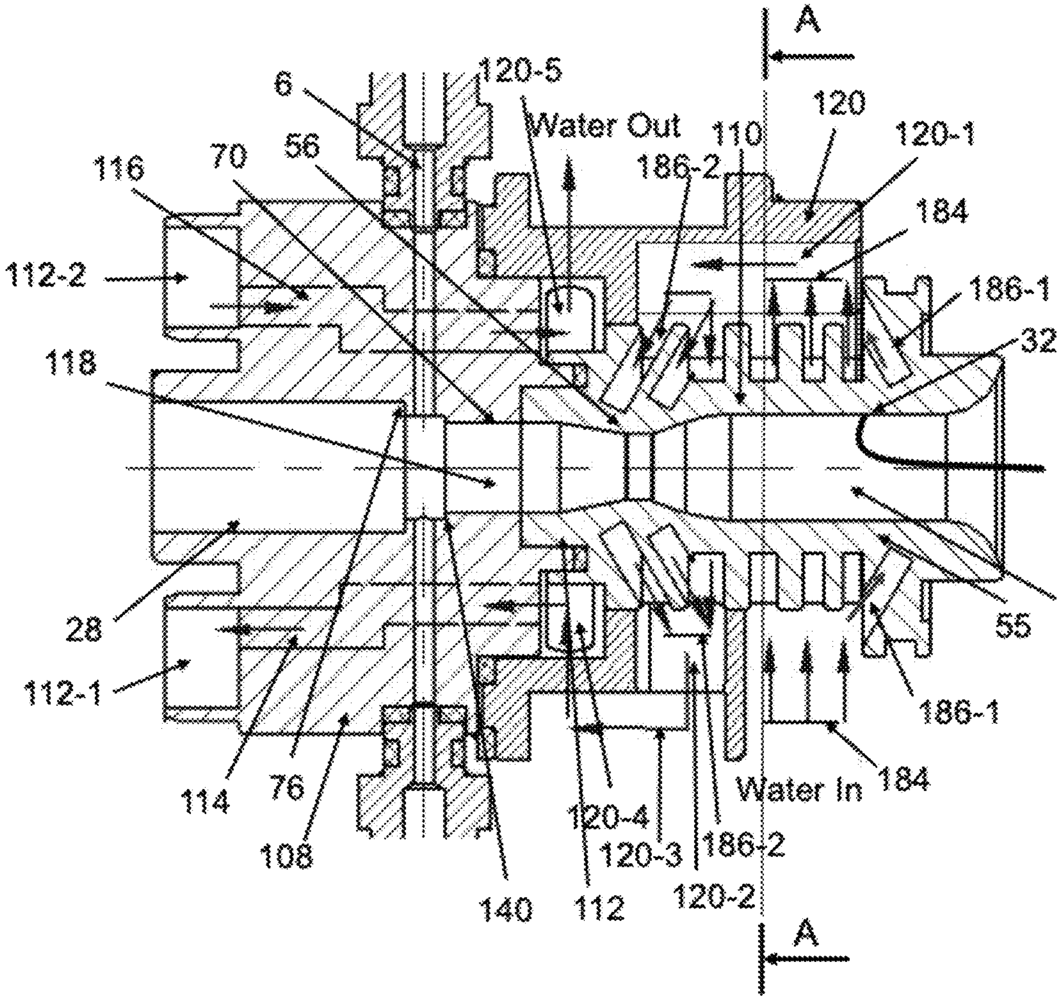
FIG. 6 illustrates a relatively more detailed portion of an optimized anode-FM combination with a more detailed view of the cooling system.

Different lengths of barrel may be preferred to spray different coatings using different feedstocks. Possible separation of the FM2 portion 58 from the anode-FM combination may be beneficial in this case and FIG. 6 illustrates this option. The FM2 module is a now a separate part 108 in this design and may partially include cylindrical downstream nozzle portion 70, both stepped expansions 76 and 140, feedstock passage 6 and barrel 28.

Anode 55 combination with converging-diverging nozzle 56 may be another separate part 110 which is subject to higher temperature and related heat flux in comparison with FM2. Therefore, radial 184 and quasi-radial 186-1 and 186-2 cooling grooves may be more efficient to use for 110 cooling in comparison with axial cooling passages 114 and 116 used for FM2 108 cooling. It may be noted that the radial and quasi-radial grooves may allow one to bring the radial cooling passages relatively closer to plasma walls where needed, thus improving cooling conditions of the part 110.

FIG. 6 also illustrates the water-cooling passages to cool parts 110 and 108 integrated into a 100-120 KW torch having water flow Qw approximately Qw=35-45 L/min at a maximum water pressure Pw of 250 psi (approximately 17 bars). This water flow is sufficient to cool a 120 kW torch described herein when the torch thermal efficiency may be as low as 50%. Difference in water in and out temperature in this case may be 20°C. The choice of Pw=17 bars or below may be explained by a 250 psi maximum rating of the major part of industrial water/power hoses used for plasma spray. Hoses having higher pressure rating may have significantly less flexibility and may cause some movement limitations and excessive loads on the robots and manipulators used for deposition of coatings. It may be noted that a 35-45 L/min water flow rate may be achieved for the disclosed torch at 17 bars water pressure or below by using appropriate sized hoses and fittings. However, higher pressure setups may be still available if needed.

In more detail the cooling water passages of the disclosed torch work as follows: Water is fed from the IEI module (not shown) into a water distributor 120 and then, going to the grooves 184 and 186. After the water cools the groves to the distributor portion 120-1 where the cooling water is turned by the water distributor and then directed to grooves 186-2 and the distributor portion 120-2. From 120-2 cooling water passes to the distributor portion 120-4 and from there to the axial water passages 114 (only one shown) to cool FM2. Upon the water reaching a portion 112-1 of water circular distributer 112, the cooling water passes to the return axial water passages 116 and portion 120-5 of the distributer 120 to the water out line (not shown) connected with the general water line from/to water pump (not shown).

Water velocity Vw (e.g. meters/second) in the anode grooves depends on the total surface area Sw (e.g. square meters) of the grooves and the water flow Qw (e.g., cubic meters per second). Water velocity (meters/sec) Vw=Qw/Sw. In the single piece anode—FM design water flow Qw simultaneously passing all cooling grooves 164 and 168 depicted on FIG. 2 and having the total surface area of all these grooves cross-section is approximately 180 $mm^2$. Thus, for 35-45 L/min flow rate it may provide water velocity of about 3.2-4.1 m/sec.

For the preferred option illustrated by FIG. 6 the entire water flow passes 3 grooves 184 and groove 186-1. Altogether these grooves have the total cross-sectional area S1 of approximately S1=65 $mm^2$. Thus, water velocity in the grooves 184 and 186 may be approximately 9-12 m/sec that is about 3 times larger than the water velocity in the single piece design without turn of the water by the distributor 120. After a turn in the portion 120-1 of the distributor 120, all water flow may be going through the groove 186-2 having the total cross-sectional area S2 of approximately S2-60 $mm^2$ that results in 8% higher velocity. It may be noted that the distributor 120 with a minor modification may provide with 3 or more water turns in the anode cooling passages, thus increasing water velocity and cooling conditions of the anode, if needed. However, it may be noted that excessive amount of water turns may result in the increased hydraulic resistance of the torch and may require higher water pressure.

Furthermore, the above disclosure of the advanced circuit of the cooling water depicted in FIG. 6 may be further considered as use of two sets of grooves providing the sequential water cooling of areas of anode-forming module 110. The first set preferably contains grooves 184 together with the groove 186-1. It may preferably have the total cooling surface area $S1=65\ mm^2=65*10^{-4}\ m^2$. At a water flow of about 35-45 $L/min=(5.8-7.5)*10^{-4}\ m^3/sec$ per approximately 100-120 KW torch power the cooling water velocity in the first set of grooves may be estimated as Vw=9-12 m/s.

The second set of grooves 186-2 may preferably have the total cooling surface area $S2=60\ mm^2=60*10^{-4}\ m^2$ that provide with even higher water velocity.

Such a preferred increase of the cooling water velocity and related improvement of the cooling conditions of the anode-forming module 110 is contemplated to be sufficient to reliably operate the torch at higher specific power 2=W/G up to 38 KJ/g. Such higher plasma power may then benefit from such higher flow rate of the cooling water.

Availability of higher specific power may be preferred, for example, when the extended barrel may be needed to provide the spraying particles with relatively longer dwell time. However, a barrel having an extended length above 10 mm may result in higher heat losses and, consequently, in relatively lower Heat Transfer Potential and Enthalpy of plasma. In this case, W/G within the range 33-38 KJ/g is contemplated to compensate for the additional heat losses and decrease of the Heat Transfer Potential and Enthalpy of plasma.

It may be noted that the anode-forming module 110 may preferably have the heat load that may be significantly above the heat load of other areas and parts of the disclosed plasma torch. Thus, no additional improvement of the cooling conditions of the torch may be needed to reliably generate specific power up to 38 KJ/g, at pressures at or above 3 bars. Therefore, the additional preferred cooling noted above can be preferably limited to only the anode-forming module 110.

What is claimed is:

1. A method for depositing a coating from a plasma torch comprising:

supplying a plasma torch including a cathode module having a cathode electrode, an anode module having an anode electrode having an anode axis, entrance zone and a cylindrical zone having diameter D1 wherein said plasma torch generates a plasma arc having an anode arc root attachment inside said anode;

said plasma torch further including a first forming module (FM1) having a converging-diverging nozzle with a throat diameter Der and with an exit diameter D2 and a second forming module (FM2) positioned downstream of said first forming module and downstream of said anode arc root attachment;

said second forming module controls one or more parameters of the plasma jet in said second forming module;

an interelectrode module controlling a plasma arc passage between said cathode electrode and said anode electrode having one end adjacent said cathode module and a second end adjacent said anode module and having a pilot insert adjacent to said cathode;

at least one neutral inter-electrode insert;

said plasma torch further comprising two passageways to feed plasma gas in a total amount G;

said plasma torch generating a voltage (U) above 150 V and current (I) below 500 A with a power W=U×I;

supplying a feedstock into said plasma jet and depositing a coating on a substrate;

wherein said plasma gas comprises more than 50 vol. % of molecular gas;

wherein W/G is in the range of 16 KJ/g to 33 KJ/g;

wherein plasma pressure is at or above 3 bars;

wherein one of said passageways for feeding plasma gas comprises a first plasma gas passage located between said cathode and pilot insert for feeding plasma gas in amount G1 wherein said gas is directed through a plurality of orifices having a surface area S1 wherein a vortex is formed having a vortex intensity Vort1=G1/S1;

wherein one of said passageways for feeding plasma gas comprises a second plasma gas passage located between said interelectrode module and said cylindrical part of anode for feeding plasma gas in an amount G2;

wherein said gas is directed through a plurality of orifices having a surface area S2 wherein a vortex is formed having a vortex intensity Vort2=G2/S2; and wherein G2 flow rate is above 25 L/min; and wherein said Vort2 is greater than 0.4 $g/((sec)(mm^2))$.

2. The method of claim 1 wherein the plasma pressure is 3 bars to 8 bars.

3. The method of claim 1 wherein Vort2 has a value in the range of above 0.40 $g/(sec*mm^2)$ up to 0.60 $g/(sec*mm^2)$.

4. The method of claim 1 wherein the G2 is in the range of 35 L/min to 75 L/min.

5. The method of claim 1 wherein the throat diameter Dcr is $(0.4\ to\ 0.6)*W^{0.5}$, where Der is measured in mm.

6. The method of claim 1 wherein said exit diameter D2 of the converging-diverging nozzle is 1.05-1.5 times the value of Dcr.

7. The method of claim 1 wherein said second forming module has a first stepped expansion having a diameter D3.

8. The method of claim 7 wherein D3 is 1.05 to 1.3 times the value of D2.

9. The method of claim 1 wherein said second forming module has a second stepped expansion having a diameter D4.

10. The method of claim 9 wherein the value of D4 is 1.1 to 1.5 times the value of D3.

11. The method of claim 7 wherein a shortest distance between the feedstock passage internal wall and the first stepped expansion is L2=0.3 mm to 2.5 mm.

12. The method of claim 9 wherein a shortest distance between the feedstock passage internal wall and the second stepped expansion is L2=0.3 mm to 2.5 mm.

13. A plasma torch comprising:

a cathode module having a cathode electrode, an anode module having an anode electrode having an anode axis, entrance zone and a cylindrical zone having diameter D1 wherein said plasma torch generates a plasma arc having an anode arc root attachment inside said anode;

said plasma torch further including a first forming module (FM1) having a converging-diverging nozzle with a throat diameter Der and with an exit diameter D2 and a second forming module (FM2) positioned downstream of said first forming module and downstream of said anode arc root attachment;

said second forming module controls one or more parameters of the plasma jet in said second forming module;

an interelectrode module controlling a plasma arc passage between said cathode electrode and said anode electrode having one end adjacent said cathode module and a second end adjacent said anode module and having a pilot insert adjacent to said cathode;

at least one neutral inter-electrode insert;

said plasma torch further comprising two passageways to feed plasma gas in a total amount G;

said plasma torch operates a voltage (U) above 150 V and current (I) below 500 A with a power W=U×I;

wherein said plasma gas comprises more than 50 vol. % of molecular gas;

wherein W/G is in the range of 16 KJ/g to 33 KJ/g;

wherein plasma pressure is at or above 3 bars;

wherein one of said passageways for feeding plasma gas comprises a first plasma gas passage located between said cathode and pilot insert for feeding plasma gas in amount G1 wherein said gas is directed through a plurality of orifices having a surface area S1 wherein a vortex is formed having a vortex intensity Vort1=G1/S1;

wherein one of said passageways for feeding plasma gas comprises a second plasma gas passage located between said interelectrode module and said cylindrical part of anode for feeding plasma gas in an amount G2;

wherein said gas is directed through a plurality of orifices having a surface area S2 wherein a vortex is formed having a vortex intensity Vort2=G2/S2;

wherein G2 flow rate is above 25 L/min; and wherein said Vort2 is greater than 0.4 g/((sec)($mm^2$)).

* * * * *